United States Patent [19]

Stursberg

[11] Patent Number: 4,911,049
[45] Date of Patent: Mar. 27, 1990

[54] WORKPIECE STOP FOR MACHINE-SHOP APPARATUS

[75] Inventor: Bernd Stursberg, Ennepetal, Fed. Rep. of Germany

[73] Assignee: Rolf Peddinghaus, Ennepetal, Fed. Rep. of Germany

[21] Appl. No.: 303,603

[22] Filed: Jan. 27, 1989

[30] Foreign Application Priority Data

Jan. 27, 1988 [DE] Fed. Rep. of Germany ....... 3802297

[51] Int. Cl.$^4$ .............................................. B26D 7/01
[52] U.S. Cl. ..................................... 83/468.5; 83/212; 83/372; 83/391; 83/468.7
[58] Field of Search ................. 83/467.1, 468.1, 468.5, 83/468.7, 212, 391, 370, 372; 269/303, 315, 317

[56] References Cited

U.S. PATENT DOCUMENTS

| | | | |
|---|---|---|---|
| 1,582,217 | 4/1926 | Henry | 83/212 |
| 2,572,137 | 10/1951 | Grieder | 83/212 |
| 3,185,006 | 5/1965 | Mercer et al. | 83/468.5 |
| 3,638,691 | 2/1972 | Larson | 83/212 |
| 3,830,125 | 8/1974 | Carmien | 83/212 |
| 4,732,066 | 3/1988 | Del Fabro et al. | 83/467.1 |

FOREIGN PATENT DOCUMENTS 1502774 9/1971 Fed. Rep. of Germany .
223568 11/1968 U.S.S.R. ................................. 83/212

Primary Examiner—Douglas D. Watts
Assistant Examiner—Scott A. Smith
Attorney, Agent, or Firm—Herbert Dubno; Andrew Wilford

[57] ABSTRACT

A stop assembly is used in combination with a machine that acts at a working station on a workpiece that is fed in a predetermined feed direction through the station. It has a base fixed to the machine adjacent the station and a support having a free end and movable on the base in the direction relative to the station and fixable in positions variably spaced in the direction from the station. A spring extending and incompressible in the direction has an outer end fixed to the free end of the support and an inner end lying between its outer end and the station. This spring is elastically deformable between its ends transverse to the direction. A stop element is fixed to the inner end of the spring and defines a stop surface turned toward and spaced from the station.

6 Claims, 1 Drawing Sheet

WORKPIECE STOP FOR MACHINE-SHOP APPARATUS

FIELD OF THE INVENTION

The present invention relates to workpiece stop for use on a piece of machine-shop equipment. More particularly this invention concerns such a stop used with a power shear, stamping machine, bender, or the like for establishing an exact workpiece position for repetitive processes.

BACKGROUND OF THE INVENTION

It is standard practice in a machining operation when cutting, bending, stamping, or otherwise acting on a succession of like workpieces to set a stop against which the ends of the workpieces are pushed so that the machining operation takes place at a particular location relative to the workpiece end. When, for instance, cutting sections off channel (U-section) workpieces in a standard shear provided with a U-shaped passage into which the channel stock is pushed longitudinally, the stop is set at a longitudinal spacing from the blades that is equal to the length of workpiece section to be cut from the stock. A similar stop is provided in a bending apparatus to ensure that the bend is positioned at the desired distance from the workpiece edge.

In German patent document No. 1,502,774 filed with a claim to a French priority date of 29 Mar. 1963 and citing U.S. Pat. Nos. 666,449, 1,337,464, 2,520,495, 2,549,560, 2,821,252, and 2,933,966 a device is shown where the stop is carried on a pair of arms linked together so that the stop can move out of the way of the workpiece once the machine, here a shear, closes. The support arms are pivotally mounted and with time the support pivot pins become somewhat loose so that the position defined by the stop is no longer accurate. In addition such a system is fairly complex, having several parts that must be regularly serviced.

Such a stop is invariably adjustable in the longitudinal direction the workpiece is displaced in as it is fed to the working station of the machine, and is also normally vertically movable too. The stop must be deflectable out of the way so that, when the machine acts on the workpiece, it does not interfere with whatever operation is being carried out. For instance in a shear the stop must be vertically deflectable to allow the cut-off end of the workpiece to drop. Such a stop is also often provided with a switch which can be connected to the actuator for the machine it is used with so that the machine only operates when a workpiece is properly pressed against the stop.

OBJECTS OF THE INVENTION

It is therefore an object of the present invention to provide an improved stop for a shop machine.

Another object is the provision of such an improved stop for a shop machine which overcomes the above-given disadvantages, that is which is of simple construction and which will remain accurate even after substantial use.

SUMMARY OF THE INVENTION

The stop assembly in accordance with this invention is used in combination with a machine that acts at a working station on a workpiece that is fed in a predetermined feed direction through the station. It has a base fixed to the machine adjacent the station and a support having a free end and movable on the base in the direction relative to the station and fixable in positions variably spaced in the direction from the station. A spring extending and incompressible in the direction has an outer end fixed to the free end of the support and an inner end lying between its outer end and the station. This spring is elastically deformable between its ends transverse to the direction. A stop element is fixed to the inner end of the spring and defines a stop surface turned toward and spaced from the station.

This arrangement is extremely simple and avoids the problems of pivots and the like employed in the prior-art stop assemblies. Since the spring is incompressible in the workpiece feed direction it accurately defines the desired workpiece position, yet its flexibility transverse to this direction makes it possible for it to move laterally out of the way as the workpiece is cut, bent, or otherwise worked on.

According to another feature of this invention the spring is a coil spring centered on an axis parallel to the direction and having a plurality of turns that normally engage one another axially. Such a spring is deflectable between its ends in any direction transverse the feed direction.

In addition according to the invention the stop element is provided with a switch in turn provided with a wire extending from the stop element through the coil spring. More particularly the stop element includes an outer part fixed to the spring inner end, an inner part forming the stop surface and movable in the direction on the outer part between an inner position and an outer position, biasing means urging the inner part in the direction away from the outer part into the inner position, and a switch carried on one of the parts and operatively engaging the other part. The switch is actuated when the inner part is moved out of the inner position. Thus if the actuator for the machine provided with the inventive stop assembly is connected to this switch, it can be set only to operate when a workpiece is properly in position against the stop.

DESCRIPTION OF THE DRAWING

The above and other objects, features, and advantages will become more readily apparent from the following, reference being made to the accompanying drawing in which.

SPECIFIC DESCRIPTION

Figure 1:
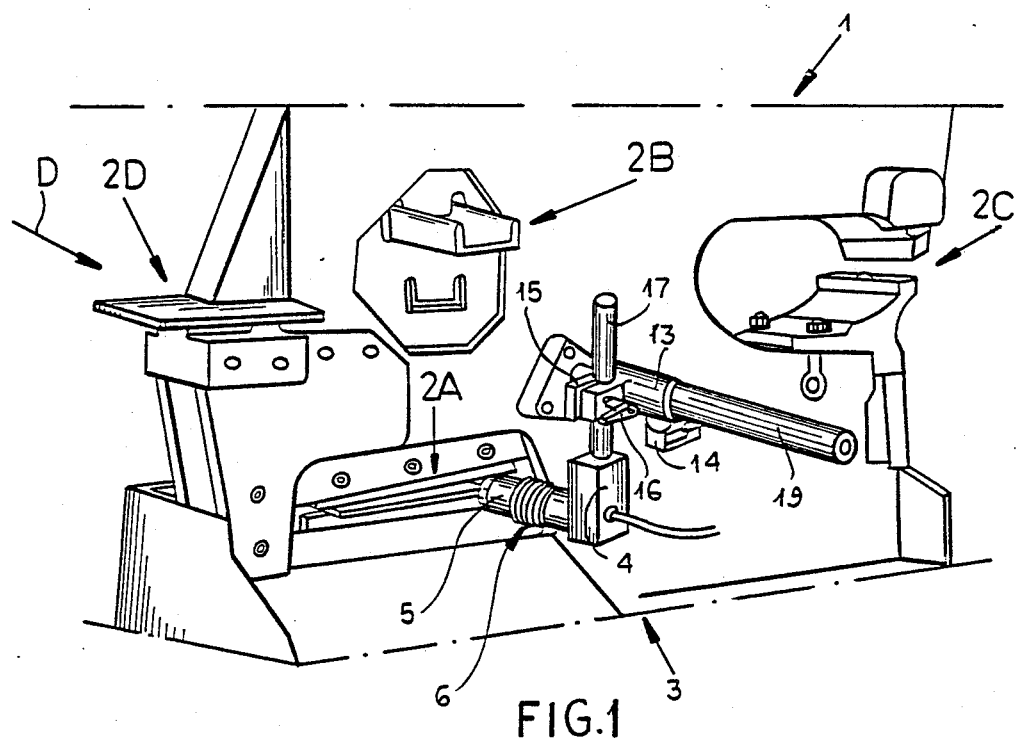
FIG. 1 is a partly diagrammatic perspective view of the machine-shop apparatus equipped with the stop assembly according to this invention.

As seen in FIG. 1 a multipurpose machine 1 is equipped with a station 2A for shearing plate or flat workpieces, a station 2B with a U-section passage for shearing channel workpieces, a station 2C for stamping or embossing, and another station 2D similarly for stamping or the like. The machine 1 is provided with a stop assembly 3 that can be set up to work with any of the stations 2A through 2D to which workpieces are fed in a direction D, although here the assembly 3 is shown aligned with the shearing station 2A.

A main support beam 19 is bolted to the machine 1 and extends parallel to the feed direction D from the housing of this machine 1. A fitting 18 has one sleeve 13 fitted on and securable via a clamp 14 to the beam 19 and another sleeve 15 extending perpendicular thereto and securable via a clamp 16 to another support beam/tube 17 carrying on its end a right-angle support block 4.

Figure 2:
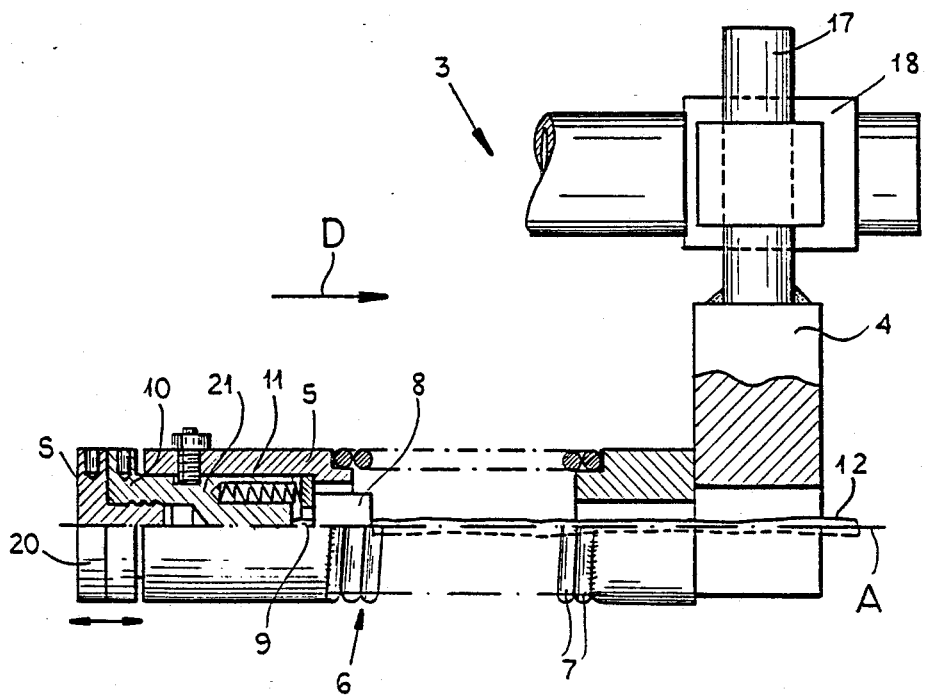
FIG. 2 is a larger-scale partly sectional view of the stop assembly of the present invention.

As best seen in FIG. 2 the support block 4 is welded to one end of a spring 6 having turns 7 centered on an axis A extending parallel to the direction D and abutting axially. The opposite end of this spring 6 is welded to a stop element 5 that forms a surface S that is aligned in the direction D with the station 2A so that a workpiece poked in the direction D through this station 2A will be stopped by engagement with this surface S.

The stop element has an iner part 10 provided with a replaceable plug 20 forming the surface S and having a stem 21 slidable in the element 5. A spring 11 urges the part 10 toward the station 2A and a microswitch 8 has an actuating plunger 9 engaging the stem 21 and wire leads 12 extending through the spring 6 back to a controller for the machine 1. Thus when a workpiece is pressed against the surface S the switch 8 part 10 is pressed outward and the switch 8 is operated to signal to the machine's controller that the workpiece is in the correct position for the machine to do its job, here cut the workpiece.

I claim:

1. In combination with a machine that acts at a working station on a workpiece that is fed in a predetermined feed direction through the station, a stop assembly comprising:
   a base fixed to the machine adjacent the station;
   a support having a free end;
   means carrying the support on the base for movement of the free end in the direction relative to the station and for fixing the free end in positions variably spaced in the direction from the station;
   a spring extending and incompressible in the direction and having an outer end fixed to the free end of the support and an inner end lying between its outer end and the station, the spring being elastically deformable between its ends transverse to the direction; and
   a stop element fixed to the inner end of the spring and defining a stop surface turned toward and spaced from the station.

2. The stop assembly defined in claim 1 wherein the spring is a coil spring centered on an axis parallel to the direction and having a plurality of turns that normally engage one another axially.

3. The stop assembly defined in claim 2 wherein the spring is deflectable between its ends in any direction transverse the feed direction.

4. The stop assembly defined in claim 2 wherein the stop element is provided with a switch in turn provided with a wire extending from the stop element through the coil spring.

5. The stop assembly defined in claim 2 wherein the spring ends are welded to the stop element and support.

6. The stop assembly defined in claim 2 wherein the stop element includes
   an outer part fixed to the spring inner end,
   an inner part forming the stop surface and movable in the direction on the outer part between an inner position and an outer position,
   biasing means urging the inner part in the direction away from the outer part into the inner position, and
   a switch carried on one of the parts and operatively engaging the other part, the spring being actuated when the inner part is moved out of the inner position.

* * * * *